United States Patent Office 3,462,401
Patented Aug. 19, 1969

3,462,401
POLYTETRAFLUOROETHYLENE MOLDING POWDER AND METHOD OF PREPARATION THEREOF
Yutaka Kometani, Takarazuka-shi, Shun Koizumi and Syozo Fumoto, Osaka, and Singo Tanigawa and Takeaki Nakajima, Mishima-machi, Osaka-fu, Japan, assignors to Daikin Kogyo Co., Ltd., Osaka, Japan, a corporation of Japan
No Drawing. Filed Jan. 4, 1966, Ser. No. 518,561
Claims priority, application Japan, Jan. 12, 1965, 40/1,176
Int. Cl. C08f 1/11, 3/24
U.S. Cl. 260—92.1                              10 Claims

ABSTRACT OF THE DISCLOSURE

A method of preparing nearly spherical granular polytetrafluoroethylene molding powder and such molding powder so produced, such method comprising polymerizing tetrafluoroethylene at a temperature of 0–100° C. at a pressure of 1–40 atmospheres in the presence of water and an organic liquid boiling below 150° C., such organic liquid being one in which chain transfer does not readily take place and which disperses in the water in the form of drops. A water soluble catalyst is employed, the reaction system being stirred until the organic liquid is completely dispersed in the water and the polymerization being conducted until the resulting polymer ranges between 0.1 and 5 g. per ml., based on the volume of the organic liquid.

---

This invention relates to polytetrafluoroethylene molding powder and more particularly to a method of preparing nearly spherical granular polytetrafluoroethylene powder having excellent fluidity and from which dense shaped articles can be obtained.

Polytetrafluoroethylene has an extremely high melt viscosity and hence the usual methods of molding thermoplastics are not used but a method similar to that of powder metallurgy is practiced in molding it. The molding of polytetrafluoroethylene is accomplished by preforming the powder into a desired shape and then sintering this shaped article to effect the fusion between the polymer particles. Hence, the properties of the sintered article are greatly influenced by such as the size, shape and hardness of the particles.

Polytetrafluoroethylene molding powder is required to possess in general the following properties:

(1) It must possess good powder fluidity and must be such that it does not aggregate and form lumps easily when being stored or transferred.
(2) It must have a uniform softness and be capable of being readily adhered together with a minimum of molding pressure to mold sintered articles not containing voids therein.
(3) Its bulk density must not change during its storage or transfer.

The first property is one which is primarily required in connection with the handling phase of the polytetrafluoroethylene molding powder. If its fluidity is good and it does not tend to form into lumps, there is the effect that the filling of molds can be carried out uniformly and readily. Further, in the case where the molding is to be by means of an automatic compression molding machine, it is an indispensable condition that the powder possesses good fluidity.

As to the second property, in the case the particles are either hard or are not of uniform hardness their intimate adhesion to each other by means of pressure becomes unsatisfactory. If the surfaces of the powder particles do not intimately adhere to each other, voids remain in the sintered article and thus dense finished articles cannot be obtained.

With respect to the third property, it is not desirable for the bulk density to change (chiefly increase) during the storage or transfer of the powder. The reason is that the bulk density is primarily described by the product for which the powder is to be used. For example, when making thin sheets or diaphragms, a powder having low bulk density is preferred. In general, however, when making sintered articles of the same shape, it becomes possible to reduce the size of the mold as the bulk density of the powder becomes higher. For instance, when the same cylindrical bodies are to be molded from powders having bulk densities of 250 g./l. and 500 g./l., respectively, the latter is more convenient since a mold of about half the size of that of the former will suffice.

When the powders that have been studied or have been made available commercially in the past are considered from this standpoint, none as yet have appeared which satisfies all of the conditions (1) to (3). For example, the polytetrafluoroethylene molding powder disclosed in U.S. Patent 3,152,201, whose fluidity is relatively good and bulk density is high, possesses to a somewhat satisfactory degree, though not perfectly, the properties (1) and (3) indicated above, but since its particles are hard and hence it does not possess the property (2), only sintered articles with voids can be obtained. On the other hand, the polytetrafluoroethylene molding powder disclosed in U.S. Patent 2,936,301, which is one containing a substantial proportion of fibrous polytetrafluoroethylene particles, having a wet-sieve size of less than 50 microns, a shape factor in the range of 5 to 12, and exhibiting an anisotropic expansion factor of 1.16 to 1.28, is not satisfactory as to its powder fluidity on account of the minute and fibrous character of its particles. Furthermore, since its bulk density is a low value of less than 300 g./l., it does not possess the aforesaid properties (1) and (3). The method of preforming the polytetrafluoroethylene powder and then pulverizing it and the method of pulverizing said powder after heat treatment, as taught in U.S. Patent 3,087,921, are also known as methods of improving the powder fluidity. In the powders obtained by these methods the particles become hard however, with the consequence that the sintered articles made from them do not become dense.

Thus, when attempts were made to improve the fluidity of polytetrafluoroethylene powder, dense sintered articles could not be obtained therefrom. On the other hand, if the powder was treated so as to obtain dense sintered articles, the powder fluidity had to be sacrificed. Thus, it was not possible to obtain a molding powder which would satisfy all of the aforesaid conditions (1), (2) and (3).

Polytetrafluoroethylene molding powder is usually prepared by polymerizing tetrafluoroethylene in an aqueous medium containing a free radical initiator, within a temperature range of 0–150° C. and a pressure range of 1–1000 atmospheres and, after washing and drying the resulting polymer, submitting the polymer to such post-treatments as pulverizing.

The polytetrafluoroethylene granular powder prepared by polymerizing tetrafluoroethylene in an aqueous phase containing a free radical catalyst but without the addition of other additives is of rough irregular shape and its particles are not uniform in hardness and size. Hence, this is made into a molding powder by pulverizing it after washing and drying. The polytetrafluoroethylene polymer however has a tendency to becoming fibrous by shearing stress. Consequently, special pulverization procedures are employed. For example, in order to prevent the polymer from becoming fibrous, procedures are followed in which the pulverization is carried out at either extremely low temperatures or in water. On the other hand, for the purpose of obtaining especially dense shaped articles, a powder containing a substantial proportion of fibrous particles is also being prepared, as disclosed in U.S. Patent 2,936,301. These conventional processes for preparing polytetrafluoroethylene molding powder required in all instances complicated mechanical treatments after the polymerization reaction. Furthermore, these powders could be obtained only at the expense of some of the properties that were required of such powders.

In preparing the polytetrafluoroethylene molding powder, it is most preferred from the standpoint of simplification of the process and economy that the polymeric powder obtained is one which will satisfy the aforesaid conditions (1), (2) and (3) without the need for any post-treatments at all but by merely being washed and dried after it is taken out of the polymerization vessel. Although, a number of attempts have been made in the past for developing such a process, none have succeeded. For example, as one of these processes there is known that of carrying out the polymerization reaction by adding a minute amount of an organic surfactant containing fluorine. Although some effects are noted in this process, it is not such that it can provide a polytetrafluoroethylene molding powder which is good enough to satisfy the aforesaid conditions (1), (2) and (3).

Further, in the conventional methods of polymerizing tetrafluoroethylene, adhesion of the polymer to the polymerization vessel walls and the agitators occurs occasionally. This gives rise to various undesirable situations such as danger of explosion, non-uniformity in the properties of the polymer and the necessity of cleaning the polymerization vessel. As methods of preventing this adhesion of the polymer to the polymerization vessel, known are such as the proper choice of the agitating conditions of the polymerization vessel and the addition of surfactants to the polymerization system. While in either case some effects in checking the adhesion of polymer are noted, neither can be regarded as being entirely satisfactory.

It is an object of the present invention to provide a method of preparing polytetrafluoroethylene molding power which has good powder fluidity, does not aggregate during storage or transfer, has a stable bulk density and and moreover can be formed into dense sintered articles, the preparation thereof being by means of only the operations of polymerization, washing and drying, without the need for pulverizing or any other post-treatments.

Another object of this invention is to provide a polymerization method in which not only the adhesion of the polymer to such as the walls of polymerization vessel does not occur, hence being without such hazards as explosions, but also whose polymerization rate is relatively high and in which the recovery of the polymer is readily accomplished.

Other objects of this invention will be apparent from the following description.

The present invention was achieved as a result of our discovery that if in polymerizing tetrafluoroethylene the reaction is carried out by using water and 0.01–0.8 by weight ratio to the water of an almost water-insoluble organic liquid, adjusting such that the polymer is obtained at the rate of 0.1–5 grams per milliliter, and preferably 0.5–3 grams per milliliter of said organic liquid, and using a water-soluble catalyst, it becomes possible to obtain nearly spherical granular polytetrafluoroethylene powders having uniform softness and good powder fluidity, from which can be prepared dense sintered articles.

When the polymerization reaction is carried out according to the present invention, the adhesion of polymer to such as the polymerization vessel wall or agitator does not occur and moreover the polymer obtained can be used as a molding powder by merely removing the organic liquid, washing and drying without the need for any such post-treatments as pulverizing. Thus, it was found that a powder completely satisfying all three of the aforesaid conditions (1), (2) and (3) could be obtained.

The process of British patent specification No. 781,532 wherein is used as the polymerization media saturated perfluorinated solvents boiling below 150° C. was known prior to the present invention. It is held that when the foregoing polymerization method is followed there are such as the following merits, as compared with the conventional methods: the rate of reaction and the yield of polymer can be increased, the pressure and temperature employed during the polymerization reaction can be lowered, and the reaction time can be shortened. Furthermore, it is held that the flow property of the resulting polymer is improved when the polymerization reaction is carried out by emulsifying the aforementioned polymerization media in water using an emulsifying agent. This polymerization method is the so-called solution polymerization, and in order that it is soluble in the polymerization media comprising the saturated perfluorinated liquids, as catalyst is used a compound which is soluble in organic liquids, namely organic catalysts such as perfluorinated peroxygen and azo compounds. In this polymerization method, even when the perfluorinated liquids are used emulsified in water, the foregoing polymerization catalyst does not dissolve in the water but remains present dissolved in the perfluorinated liquid, which is used as the polymerization medium. Further, the perfluorinated liquids which are used as the polymerization media in this method are means to be those compounds which have been completely fluorinated, and hence are very expensive and are difficult to obtain. Consequently, they must be recovered at a high rate after completion of the polymerization. Thus, there is the disadvantage commercially in that the need arises for complicated equipment requiring considerable expense.

On the other hand, the method of polymerizing tetrafluoroethylene of the present invention may be considered as a new polymerization method when compared with the method of the aforementioned British patent or the other known polymerization methods. Namely, in the present invention the organic liquid is used dispersed in the water and the tetrafluoroethylene monomers are present dissolved in said organic liquid. Since the catalyst is water-soluble, it is present dissolved only in the water and is not present in the organic liquid used in the polymerization reaction. The invention polymerization method differs from the solution polymerization in this respect, and neither is it the suspension polymerization.

The first advantage of the present invention lies in the point that the polytetrafluoroethylene molding powder obtained by this invention is so soft that fully dense sintered articles are obtained at relatively low molding pressure notwithstanding the fact that it possesses good fluidity. The use of a catalyst soluble in water but almost insoluble in organic liquids is an important factor in this invention. If a catalyst soluble in the organic liquid is used, the catalyst becomes dissolved into the dispersed drops of the organic liquid in which the tetrafluoroethylene is dissolved, and free radicals are formed in the drops followed by a polymerization reaction taking place, thus resulting in the polymeric particles formed becoming hard to yield a polytetrafluoroethylene powder unsuited for the purpose intended by the present invention. The particles such as these have moreover the defect that the unreacted catalyst which inevitably remains behind in the particles is difficult to remove by washing. In addition, according to experiments conducted by us, when a catalyst soluble in an organic liquid was used, the phenomenon of a hard polymer adhering to the polymerization vessel was observed frequently, though the reason therefor was not clear.

The second advantage of the present invention lies in the point that it is not necessarily required to use as the organic liquid a completely fluorinated compound. It has been generally regarded that it is necessary to use a completely fluorinated compound as the polymerization medium to prevent a decrease in the molecular weight of the polymer as a result of chain transfer during the polymerization reaction. In the polymerization method according to the present invention, since it is not necessary to use as polymerization medium the expensive perfluorinated organic liquids, it becomes commercially a great advantage.

The following detailed description is illustration of the embodiment of the present invention.

The organic liquid to be used in the invention method must be one in which chain transfer takes place with relative difficulty when polymerizing tetrafluoroethylene, and another important condition is that it must be almost insoluble in water. For obtaining nearly spherical granular polytetrafluoroethylene powder, the organic liquid must be drops in the aqueous medium in the form of dispersed. This is important, for if an organic liquid which is soluble in an aqueous medium is used, it would not become a dispersion in the aqueous medium and hence spherical granular particles could not be obtained. Further, it is preferred that the organic liquid has a boiling point of below 150° C., and more preferably below 100° C. The reason for this is that although the organic liquid must be a liquid under the polymerization conditions, the elimination from the polymer particles after completion of the polymerization becomes difficult in the case of those boiling above 150° C. Further, the use of an active organic liquid is unsuitable, because of the formation of low molecular weight polymers by the setting up of so-called chain transfer during the polymerization reaction by means of the reaction of the polymer chain with said organic liquid. As examples of the organic liquids which satisfy these conditions, included are the fluorine-containing halogenated saturated hydrocarbons such as tetrachloro difluoroethane ($CCl_2F$—$CCl_2F$) trichlorotrifluoroethane ($CCl_2F$—$CClF_2$), dichlorotetrafluoroethane $$(CClF_2-CClF_2)$$

trichlorofluoromethane ($CCl_3F$), monochlorohexafluoropropane ($HCF_2CF_2CF_2Cl$) and monochlorooctfluorobutane ($HCF_2CF_2CF_2CF_2Cl$). The perfluorinated hydrocarbons are also effectively usable as the polymerization media of this invention, but as their cost is excessively high, they cannot be regarded as being desirable polymerization media from the commercial standpoint.

Although the amount used of the aforesaid organic liquids depends upon such as the agitating conditions and specific gravity of the organic liquid, it is necessary to use them in an amount of 0.01–0.8 by weight ratio to the aqueous medium even when the polymerization reaction is carried out under usual agitating conditions, a ratio of 0.01–0.4 being particularly preferred. The reason is as follows. The present invention is featured not only in the point that an organic liquid is used as the polymerization medium but in the point that an organic liquid is well dispersed in an aqueous medium so as to form the particles of polytetrafluoroethylene in the dispersed drops of the organic liquid. Thus nearly spherical granular powder having uniform softness is obtained. When the amount used of the organic liquid exceeds 0.8 by weight ratio to the aqueous medium when using an agitator of the usual setup, a desirable dispersed state of said organic liquid cannot be obtained, with the consequence that the polymer obtained is fibrous or lumpy, thus not yielding the polymer in a spehical granular shape as intended by the present invention. The smaller the weight ratio of the organic liquid to the aqueous medium, the more easily can spherical polymers of uniform particle size be obtained, but since the yield of polymer is limited by the amount used of the organic liquid, a weight ratio which is too small becomes an economic disadvantage. Generally speaking, when the amount used of the organic liquid is a weight ratio not more than 0.01 to the water, it is commercially of no value.

Furthermore, as the other condition for obtaining nearly spherical granular polytetrafluoroethylene powder having satisfactory softness, it is very important that the amount obtained of the polymer be controlled. Namely, it is necessary that within the foregoing weight ratio range of the organic liquid to the aqueous medium the rate of the polymer obtained is 0.1–5 grams per milliliter, preferably 0.5–3 grams per milliliter and still more preferably 0.7–2.5 grams per milliliter, of the organic liquid. When this rate exceeds 5 grams per milliliter, the polymer not only becomes a granular form having projections on its surface but its exterior also becomes hard, and hence not having a uniform softness, post-treatments such as pulverizing become necessary. On the other hand, when the foregoing rate is not more than 0.1 gram per milliliter, the formation of spherical particles in the organic drops are not perfect, thus yielding imperfect particles of unsatisfactory powder fluidity. When this rate is still smaller, the polymer is obtained in a slurry form.

The polymerization catalyst, as previously noted, is also a very important factor for preparing the polytetrafluoroethylene powder of good fluidity and having a uniform softness. The polymerization catalysts which are water-soluble but almost insoluble in organic liquids and hence are conveniently usable in the present invention include the inorganic peroxides such as hydrogen peroxide and ammonium persulfate or the redox catalysts such as ammonium persulfate-sodium bisulfite, ammonium persulfate-sodium bisulfite-ferrous sulfate or -silver nitrate or -cupric sulfate.

The agitating conditions during the polymerization reaction is also an important factor. Namely, when the agitation is carried out vigorously, the dispersion of the organic liquid in the aqueous medium proceeds uniformly and the size of the dispersed drops becomes small, and as a result the particle size of the polymer obtained becomes small and uniform.

The construction of the polymerization vessel and the agitator are also important factors having great effects on the polymer particles. When an organic liquid of an especially great specific gravity is used, the liquid tends to accumulate in the bottom of the polymerization vessel. Hence, it is preferred that a polymerization vessel equipped with agitating vanes in its bottom be used.

The polymerization reaction in this invention may be carried out at a temperature ranging between 0° C. and 100° C., and preferably between 0° C. and 50° C. At a polymerization temperautre of above 0° C. the polymer particles with better spherical shape can be obtained as the temperature is lowered, but with the increase of a temperature, spherical shape disappears.

A polymerization pressure in this invention ranges between 1 and 40 atmospheres, preferably between 2 and 30 atmospheres. As the polymerization reaction proceeds in a state in which the monomer is dissolved in the said organic liquid, the polymerization rate is high even though the polymerization reaction is carried out at lower pressure than the conventional polymerization processes.

A major proportion of the particles of the granular polytetrafluoroethylene powder obtained in this invention are of nearly spherical shape compared with a conventional polytetrafluoroethylene powder with irregular shape. The average particle size of the polytetrafluoroethylene powder obtained in this invention is less than 5000 microns, and preferably less than 2500 microns, and the angle of repose of the powder is less than 45 degrees, and preferably less than 40 degrees.

The polytetrafluoroethylene powder of the invention has a softness of the order that when several particles are pressed between the fingers they can be easily flattened. Although it is generally difficult to express the softness of particles directly quantitatively, it can be judged compositely by the various following indirect methods. For example, there is a method of measuring the specific surface area of the nitrogen adsorption of the powder particles. As this value is believed to be proportional to the porosity of the particles, it can be regarded that the larger this value, the softner the particle. The specific surface area of the nitrogen adsorption of the powder particles in this invention is at least 2 square meters per gram, and preferably 3–9 square meters per gram. The microscopic examination of a shaving from a sintered article molded under specific conditons from the powder particles can also become to a certain extent a measure for judging the softness of the powder. Hardly any voids can be observed by means of a microscopic examination in the case of shavings from a sintered article molded from soft powder particles. When a shaving of the order of 10 microns is shaved with a microtome from a sintered article molded from the invention powder particles and examined under an optical microscope of above 100 powers, hardly any voids can be observed. Further, the dielectric strength of a sintered article becomes higher as the powder particles become softer, while the surface smoothness of a sintered article exhibits a greater value as the powder particles become softer. The dielectric strength exhibited by the sintered articles obtained from the powder of the present invention is above 5500 v./0.1 mm., and preferably above 7000 v./0.1 mm., and its surface smoothness is about 15 seconds, and preferably above 20 seconds.

Another feature of the polytetrafluoroethylene powder obtained by this invention is that despite the fact that it provides dense sintered articles its anisotropic expansion factor is small. The anisotropic expansion factor becomes a measure of the variations of dimentions during molding, and in this respect the invention polytetrafluoroethylene powder has an advantage in that its anisotropic expansion factor being below 1.16 its variation of dimention during molding is small. This is believed to be due to the fact that no special post-treatments such as pulverizing are carried out after the polymerization.

A still another feature of the polytetrafluoroethylene powder of this invention is that its degree of surface smoothness is great, this value being above 15 seconds. This is considered to be due to such as the shape and uniform softness of its particles.

The tensile strength of the shaped articles obtained from the polytetrafluoroethylene powder of this invention is at least 2.0 kilograms per square millimeter, and preferably at least 2.1 kilograms per square millimeter. The elongation is at least 180 percent, and preferably 200–400 percent.

The molecular weight of the invention polytetrafluoroethylene powder is 5–13 million, preferably 6–11 million.

The various foregoing properties of the invention polytetrafluoroethylene powder and of the sintered articles molded therefrom are determined in the following manner.

The angle of repose is determined as follows: A stainless steel funnel having a top inside diameter of 60 mm., bottom inside diameter of 6 mm., a height of 60 mm. and provided at its outlet with an orifice of 6 mm. in inside diameter and 3 mm. in length is disposed separated 20 mm. from the floor. The measurement is performed by flowing the powder to be measured gently through this funnel. The powder piles up on the floor until finally the apex of the pile makes contact with the outlet of the funnel. As the powder piles up in a nearly conical form, the radius ($\gamma$) of the base thereof is measured, and the angle of repose is obtained by the following equation:

$$\text{Angle of repose } \theta = \tan^{-1}(20/\gamma)$$

In measuring the angle of repose, it is necessary that in advance of the measurement the powder to be tested is thoroughly desiccated and also removed of its static electricity. Further, the measurement is made at 23° C.

The dielectric strength is determined in the following manner. Fifty grams of the polytetrafluoroethylene powder sample are preformed to a cylindrical shape at a pressure of 300 kilograms per square centimeter in a mold having an inside diameter of 30 mm., after which the performed article is placed in an electric furnace and its temperature is raised from 100° C. to 370° C. at the rate of 96° C./hr. The temperature of the article is maintained at 370° C. for 8 hours following which its temperautre is gradually cooled to 240° C. at the rate of 48° C./hr. The power of the electric furnace is then cut off and the article is allowed to stand until its temperature falls to below 100° C. A tape 0.1 mm. is thickness is machined from the so obtained sintered article. Using this tape, its dielectric strength in air is measured in accordance with the method JIS–K–6887–1963. Forty measurements are made and the average value thereof is adopted as the dielectric strength.

The surface smoothness is measured by compressing an 18-gram sample of the polytetrafluoroethylene granular powder in a die having flat finished flawless surface and a diameter of 100 mm., at a pressure of 300 kilogram per square centimeter to prepare the preform, followed by sintering at 360° C. for 2 hours. The molded polytetrafluoroethylene plate of about 1.5 mm. thickness is measured using the Beck Smoothness Tester prescribed in JIS P8119–1963. The smoothness refers to the time (second) during which 10 cc. of air permeates through the sample plate on the sample receiving table of the tester (which is made of an optical glass having a ground surface and an effective area of $10 \pm 0.5$ square centimeters). The measurement is made at 23° C., repeated three times for each surface of the sample plate, and the value of surface smoothness is determined by averaging the measurements.

In determining the molecular weight, 5 grams of the polytetrafluoroethylene powder sample is preformed to a disc shape under 300 kilogram per square centimeter in a mold 30 mm. in inside diameter, sintered for 40 minutes at 360° C., followed by gradually cooling to 300° C. at the rate of 20° C./hr. and thereafter allowing to stand in air until its temperature reaches room temperature. The specific gravity of the so obtained sintered article is measured at 23° C. Calculation of the molecular weight is then performed by substituting this value D in the following equation, where M has the unit $10^6$.

$$\log_{10} M = -9.967 \times D + 22.524$$

The tensile strength and elongation are determined by molding a 0.5 mm.-thick sheet, punching out therefrom dumbbell type specimens having a midsection width of 5 mm. and conducting the tests by applying a given load to a 20-mm. length of the midsection of the foregoing specimens.

The specific surface area of nitrogen adsorption is determined by the BET method.

The anisotropic expansion factor is measured in the way as set forth below.

Four and one-tenth grams of powder is weighed into a half-inch square rectangular mold cavity and compressed at a temperature of 23° C. Pressure is built up to 2000 p.s.i. during one minute and held during two minutes. The roughly cubical preform thus obtained is measured for its width, breadth and height (i.e., the X, Y and Z axes, respectively, where Z is the axis compressed during preforming). The measured preforms are baked for 30 minutes at 380° C. $\pm 0.5°$ C., allowed to cool in air to room temperature, and remeasured. The anisotropic expansion factor refers to a value of $Z_s/Z_p$ divided by $$X_s + Y_s / Y_p + Y_p$$

where $X_p$, $Y_p$ and $Z_p$ are the axial measurements of the preform and $X_s$, $Y_s$ and $Z_s$ are the axial measurements of the sintered article. It is noted that these measurements must be made at 23° C.

Particularly good results are obtained in molding the nearly spherical granular polytetrafluoroethylene molding powder of this invention when used in the ram extrusion molding and the automatic molding methods as well as the usual compression molding method. In the ram extrusion molding and automatic molding methods, factors of importance are that the powder be one which has good powder fluidity and that its bulk density is uniform and does not change. These conditions are completely satisfied by the invention polytetrafluoroethylene powder.

The following examples are given to further illustrate the present invention.

EXAMPLE 1

One million parts of deoxygenated water and 300,000 parts of trichlorotrifluoroethane were charged in a polymerization vessel equipped with an anchor type agitator. After the air was thoroughly eliminated, tetrafluoroethylene was supplied at 3° C. until the pressure in the vessel had built up to 6 atmospheres during which time the agitation was continued at a speed of 400 r.p.m. This was followed by the addition of 10 parts of ammonium persulfate, 5 parts of sodium bisulfite and 5 parts of ferrous sulfate. As a drop in the pressure occurred with the start of the polymerization reaction, tetrafluoroethylene was continuously supplied in accordance with its rate of consumption and the pressure was maintained at 6 atmospheres. After having consumed 300,000 parts of tetrafluoroethylene in about 2 hours, the unreacted tetrafluoroethylene was liberated and the reaction was terminated. The reaction vessel was then opened and 300,000 parts of polytetrafluoroethylene containing trichlorotrifluoroethane were taken out.

No adhesion of polymer to the walls of the polymerization vessel was observed. After elimination of the trichlorotrifluoroethane, the polymer powder obtained by washing and drying the reaction product had an average particle size of 1000 microns and practically all the particles were granules of nearly spherical shape having a softness they could be flattened between the fingers. The other properties of the powder were as follows:

Angle of repose, 30.2 degrees; specific surface area of nitrogen adsorption, 3.0 square meters per gram; surface smoothness, 60 seconds; tensile strength, 2.6 kilograms per square millimeter; elongation, 300 percent; average dielectric strength, 9,200 v./0.1 mm.; anisotropic expansion factor, 1.13; molecular weight, 8,200,000.

EXAMPLE 2

The polymerization reaction was carried out under identical conditions as in Example 1, except that the agitation speed employed was 600 r.p.m.

No adhesion of polymer to the walls of the polymerization vessel was observed. The polymer obtained by washing and drying the reaction product after elimination of the trichlorotrifluoroethane had an average particle size of 750 microns and practically all the particles were granules of nearly spherical shape. The other properties of the powder were as follows:

Angle of repose, 35 degrees; specific surface area of nitrogen adsorption, 3.3 square meters per gram; surface smoothness, 58 seconds; tensile strength, 2.7 kilograms per square meter; elongation, 300 percent; average dielectric strength 9,000 v./0.1 mm.; anisotropic expansion factor, 1.14; molecular weight, 8 million.

EXAMPLE 3

The polymerization reaction was carried out under identical conditions as in Example 1, except for the following changes. Instead of 300,000 parts of trichlorotrifluoroethane, 300,000 parts of monochlorohexafluoropropane were used; instead of 10 parts of ammonium persulfate, 5 parts of sodium bisulfite and 5 parts of ferrous sulfate, 8 parts of ammonium persulfate and 4 parts of sodium bisulfite were used; a temperature of 25° C. was used instead 3° C., and besides the same agitator as in Example 2, another agitator equipped with propellor type vanes and having an agitation speed of 800 r.p.m. was installed in the bottom of the vessel.

No polymer adhesion to the walls of the polymerization was noted. The polymer powder washed and dried after elimination of the monochlorohexafluoropropane had an average particle sige of 700 microns, and practically all the particles were granules of nearly spherical shape. The other properties of the resulting powder were as follows:

Angle of repose, 35 degrees; specific surface area of nitrogen adsorption, 3.0 square meters per gram; tensile strength, 2.5 kilograms per square millimeter; elongation, 280 percent; average dielectric strength, 8,500 v./0.1 mm.; molecular weight, 7 million.

EXAMPLE 4

The polymerization reaction was carried out as in Example 2, except that a pressure of 8 atmospheres was used and the amount to be obtained of the polytetrafluoroethylene was set at 180,000 parts.

No polymer adhesion was noted on the walls of the polymerization vessel. After elimination of the trichlorotrifluoroethane, the polymer powder obtained after washing and drying the reaction product had an average particle size of 650 microns, and practically all the particles were granules of nearly spherical shape which were somewhat softer than those of Example 1. The other properties were as follows:

Angle of repose, 40 degrees; specific surface area of nitrogen adsorption, 3.6 square meters per gram; surface smoothness, 75 seconds; tensile strength, 2.6 kilograms per square millimeter; elongation, 320 percent; average dielectric strength, 7,600 v./0.1 mm.; molecular weight, 7,200,000.

EXAMPLE 5

Example 4 was repeated excepting that the amount to be obtained of the polytetrafluoroethylene was set at 400,000 parts.

The adhesion of polymer to the walls of the polymerization vessel did not occur. The polymer powder obtained by washing and drying the reaction product after removal of the trichlorotrifluoroethane had an average particle size of 850 microns, and practically all the particles were nearly spherical granules, which were somewhat harder than those of Example 1. The other properties were as follows:

Angle of repose, 30 degrees; specific surface area of nitrogen adsorption, 3.0 square meters per gram; surface smoothness, 50 seconds; tensile strength, 2.4 kilograms per square millimeter; elongation, 280 percent; average dielectric strength, 7,400 v./0.1 mm.; molecular weight, 9 million.

EXAMPLE 6

The polymerization reaction was carried out as in Example 5 with the following exceptions: 300,000 parts of dichlorotetrafluoroethane were used instead of 300,000 parts of trichlorotrifluoroethane; an agitator of the four-vaned propellor type was used instead of the anchor type agitator; a temperature and pressure of 2° C. and 7 atmospheres, respectively, were used; and the amount of polytetrafluoroethylene to be obtained was set at 520,000 parts.

No adhesion of polymer on the walls of the polymerization vessel was noted. After removal of the dichlorotetrafluoroethane, the polymer powder obtained by washing and drying the reaction product had an average particle size of 1000 microns, practically all of which were granules of nearly spherical shape. These granules were somewhat harder than those obtained in Example 5. The other properties were as follows:

Angle of repose, 36 degrees; specific surface area of nitrogen adsorption, 2.1 square meters per gram; surface smoothness, 30 seconds; tensile strength, 2.6 kilograms per square millimeter; elongation, 300 percent; average dielectric strength, 7,200 v./0.1 mm.; molecular weight, 10 million.

EXAMPLE 7

Excepting that 185,000 parts of the trichlorotrifluoroethane were used, the pressure employed was 15 atmospheres and the amount of the polytetrafluoroethylene to be obtained was set at 420,000 parts, the polymerization reaction was otherwise carried out as in Example 1.

No adhesion of polymer to the walls of the polymerization vessel was noted. After removal of the trichlorotrifluoroethane, the reaction product was washed and dried to yield a polymer powder having an average particle size of 1,000 microns, whose granules were practically all of nearly spherical shape. These particles had a surface which was slightly uneven and they were somewhat harder than those of Example 6. The other properties were as follows:

Angle of repose, 42 degrees; specific surface area of nitrogen adsorption, 2.2 square meters per gram; surface smoothness, 20 seconds; tensile strength, 2.1 kilograms per square millimeter; elongation, 180 percent; average dielectric strength, 6,000 v./0.1 mm.; molecular weight, 10 million.

EXAMPLE 8

The polymerization reaction was carried out as in Example 1, except that 150,000 parts of trichlorotrifluoroethane and 150,000 parts of tetrachlorodifluoroethane were used instead of 300,000 parts of trichlorotrifluoroethane, and the amount of the polytetrafluoroethylene to be obtained was set at 320,000 parts.

No polymer adhesion to the walls of the polymerization vessel was noted. The polymer powder obtained by washing and drying the reaction product after elimination of the trichlorotrifluoroethane and tetrachlorodifluoroethane therefrom had a particle size averaging 950 microns, which were granules which were practically all nearly spherical in shape. The other properties were as follows:

Angle of repose, 32 degrees; specific surface area of nitrogen adsorption, 3.0 square meters per gram; surface smoothnes, 50 seconds; tensile strength, 2.5 kilograms per square millimeter; elongation, 280 percent; average dielectric strength, 9,000 v./0.1 mm.; molecular weight, 8 million.

EXAMPLE 9

Excepting that 30 parts of hydrogen peroxide and 25 parts of ferrous sulfate were used instead of 10 parts of ammonium persulfate, 5 parts of sodium bisulfite and 5 parts of ferrous sulfate, the temperature employed was 40° C., the polymerization reaction was otherwise carried out as in Example 1.

The adhesion of polymer to the walls of the polymerization vessel did not occur. The polymer powder obtained by washing and drying the reaction product after removing the trichlorotrifluoroethane had an average particle size of 1,200 microns and practically all the particles were granules of nearly spherical shape. These particles had a surface which was somewhat more uneven than those of Example 1. The other properties were as follows:

Angle of repose, 38 degrees; specific surface area of nitrogen adsorption, 3.0 square meters per gram; surface smoothness, 42 seconds; tensile strength, 2.8 kilograms per square millimeter; elongation, 300 percent; average dielectric strength, 8,000 v./0.1 mm.; molecular weight, 7,500,000.

EXAMPLE 10

The polymerization reaction was carried out under identical conditions as in Example 1, excepting for the following changes: 300,000 parts of perfluorohexane were used instead of 300,000 parts of trichlorotrifluoroethane; 10 parts of ammonium persulfate were used instead of 10 parts of ammonium persulfate, 5 parts of sodium bisulfite and 5 parts of ferrous sulfate; and a temperature of 60° C. was used.

No adhesion of polymer to the walls of the polymerization vessel was noted. The polymer powder obtained by washing and drying the reaction product after eliminating the perfluorohexane therefrom had an average particle size of 1,000 microns, and practically all were granules of nearly spherical shape, the surface of which were slightly uneven. The other properties were as follows:

Angle of repose, 40 degrees; surface smoothness, 30 seconds; tensile strength, 2.3 kilograms per square millimeter; elongation, 300 percent; average dielectric strength, 7,000 v./0.1 mm.; molecular weight, 7 million.

EXAMPLE 11

The polymerization reaction was carried out as in Example 1, with the exception that 500,000 parts of the trichlorotrifluoroethane were used, a propellor type agitating vane having a speed of 800 r.p.m. was provided at the bottom of vessel in addition to the same type of agitator used in Example 2, and the amount of the polytetrafluoroethylene to be obtained was set at 230,000 parts.

No polymer adhesion to the walls of the polymerization vessel was observed. The polymer powder obtained by washing and drying the reaction product after elimination of the trichlorotrifluoroethane had an average particle size of 2,700 microns, and although practically all were granules of nearly spherical shape, they had a surface which was slightly uneven. The particles were soft however. The other properties were as follows:

Angle of repose, 43 degrees; tensile strength, 2.2 kilograms per square millimeter; elongation; 340 percent; molecular weight, 7 million.

Comparison 1

The polymerization reaction was carried out under the same conditions as in Example 2, except that 50,000 parts of the trichlorotrifluoroethane were used, a temperature of 5° C. was used, and the amount of polytetrafluoroethylene to be obtained was set at 230,000 parts.

No polymer adhesion was noticed on the walls of the polymerization vessel. The polymer powder obtained by washing and drying the reaction product after removing the trichlorotrifluoroethane had an average particle size of 1500 microns. The particles were hard and practically all had a surface abounding in unevenness and prickles. The other properties were as follows:

Angle of repose, 45 degrees; specific surface area of nitrogen adsorption, 1.0 square meter per gram; surface smoothness, 13 seconds; tensile strength, 1.5 kilograms per square millimeter; elongation, 150 percent; average dielectric strength, 3,000 v/0.1 mm.; molecular weight, 9,500,000.

Comparison 2

The polymerization reaction was carried out as in Example 1, except that instead of 10 part of ammonium persulfate, 5 parts of sodium bisulfite and 5 parts of ferrous sulfate; 10 parts of t-butyl-perbenzoate, 10 parts of sodium bisulfite and 4 parts of iron phosphate soluble in organic liquid were used; and a temperature of 20° C. was employed.

Although the particles obtained were nearly spherical, they were harder than the polymeric particles of the present invention. Furthermore, there was a hard adhesion of polymer to the walls of the polymerization vessel.

The specified surface area of nitrogen adsorption of these polymeric particles was 1.0 square meter per gram and the average dielectric strength 4,000 v./0.1 mm.

Comparison 3

Polymerization reaction was carried out under the same conditions as in Example 1, excepting that 1,000,000 parts of trichlorotrifluoroethane were used and in addition to the agitator as used in Example 2 a propellor type agitat-

13 ing vane having a speed of 800 r.p.m. was installed in the bottom of the vessel.

The resulting polymer particles were fibrous and required pulverizing before being used as a molding powder.

Comparison 4

The polymerization reaction was carried out as in Example 1 with the exception of the following changes: 300,000 parts of perfluoroheptane were used instead of 300,00 parts of trichlorotrifluoroethane; 500 parts of alpha, alpha-azodiisobutyronitrile were used instead of 10 parts of ammonium persulfate, 5 parts of sodium bisulfite and 5 parts of ferrous sulfate; a temperature of 75° C. and a pressure of 10 atmospheres were used. The adhesion of a very hard polymer to the walls of the vessel occurred.

EXAMPLE 12

The polytetrafluoroethylene molding powder obtained in Example 1 was preformed into an annular sheet by means of an automatic compression molding machine. The deviations in the weight and thickness of these shaped articles and sintered articles and the properties of the intered articles were studied.

The automatic compression molding machine is made up of a mold, a table, a feeder box with a hole in its bottom, and a hopper. The mold consists of a vertical mold cylinder having an inside diameter of 83 mm., a mandrel having an outside diameter of 44 mm. and concentrically disposed of said cylinder, a hollow cylindrical lower punch set in a position in contact with the inner surface of said cylinder and outer surface of said mandrel so as to form an annular space 7 mm. high between said cylinder and mandrel, and an upper punch adapted to press between its bottom end and the top end of the aforesaid lower punch the polytetrafluoroethylene powder which has been charged into the aforesaid annular space. The table forms a plane which coincides with the top ends of the mold cylinder and the mandrel. The feeder box which has been filled with the polytetraethylene powder from the hopper moves over the table top and upon arriving at above the aforementioned annular space drops the polyeterafluoroethylene powder from the hole in its bottom to charge said space with the powder. The polytetrafluoroethylene charged into said space is then pressed between the upper and lower punches and an annular sheet is preformed.

Employing a preforming pressure of 300 kilograms per square centimeter and a pressure dwell period of 2 seconds, 50 preformed articles were molded. These preformed articles were placed in a furnace and their sintering was carried out by raising the temperature at a prescribed rate from 50° C. over a 4-hour period, followed by maintaining the temperature of 360° C. for 4 hours, after which the articles were allowed to cool in the furnace. These heating, sintering and cooling treatments were carried out in a free state with the preformed articles being subjected to no compressive force whatsoever.

When the fluidity of the powder is poor, the powder usually forms a bridge in the hopper and does not drop into the feeder box. In this example, no such phenomenon was noted at all.

The weight deviation of the preformed articles was a very small value of 15.74 g. ±0.08 g., and the thickness deviation was also very small, being 1.5 mm. ±0.0183 mm.

The sintered articles exhibited excellent properties with respect to both their tensile strength and elongation. Furthermore, they were dense and no voids should be observed even when examined with a microscope.

We claim:

1. A method of preparing nearly spherical granular polytetrafluoroethylene molding powder which consists essentially of polymerizing tetrafluoroethylene at a temperature of 0–100° C. and a pressure of 1–40 atmospheres in the presence of water, 0.01–0.8 by weight ratio to the water of an organic boiling below 150° C., said organic liquid being one in which chain transfer does not readily take place and which readily disperses in said water in the form of drops and a water-soluble polymerization catalyst said reaction being effected with stirring so that the organic liquid is completely dispersed in the water, said tetrafluoroethylene being polymerized until the amount obtained of the resulting polymer ranges between 0.1 and 5 grams per milliliter, based on the volume of said organic liquid.

2. A method of preparing nearly spherical granular polytetrafluoroethylene molding powder which consists essentially of polymerizing tetrafluoroethylene at a temperature of 0–100° C. and a pressure of 2–30 atmospheres in the presence of water, 0.07–0.4 by weight ratio to the water of an organic liquid boiling below 150° C., said organic liquid being one in which chain transfer does not readily take place, and which readily disperses in said water in the form of droplets and a polymerization catalyst which is water-soluble but is insoluble in said organic liquid, said reaction being effected with stirring so that the organic liquid is completely dispersed in the water, said tetrafluoroethylene being polymerized until the amount obtained of the resulting polymer ranges between 0.1 and 5 grams per milliliter, based on the volume of said organic liquid.

3. A method of preparing nearly spherical granular polytetrafluoroethylene molding powder which consists essentially of polymerizing tetrafluoroethylene at a temperature of 0–100° C. and a pressure of 1–40 atmospheres in the presence of water, 0.01–0.8 by weight ratio to the water of an organic liquid boiling below 150° C., said organic liquid being one in which chain transfer does not readily take place and which readily disperses in said water in the form of droplets and a polymerization catalyst which is water-soluble but is insoluble in said organic liquid, said reaction being effected with stirring so that the organic liquid is completely dispersed in the water, said tetrafluoroethylene being polymerized until the amount obtained of the resulting polymer ranges between 0.5 and 3 grams per milliliter, based on the volume of said organic liquid.

4. A method of preparing nearly spherical granular polytetrafluoroethylene molding powder which consists essentially of polymerizing tetrafluoroethylene at a temperature of 0–100° C. and a pressure of 2–30 atmospheres in the presence of water, 0.07–4 by weight ratio to the water of an organic liquid boiling below 150° C., said organic liquid being one in which chain transfer does not readily take place and which readily disperses in said water in the form of drops and a polymerization catalyst which is water-soluble but is insoluble in said organic liquid, said reaction being effected with stirring so that the organic liquid is completely dispersed in the water, said tetrafluoroethylene being polymerized until the amount obtained of the resulting polymer ranges between 0.5 and 3 grams per milliliter, based on the volume of said organic liquid.

5. A method of preparing nearly spherical granular polytetrafluoroethylene molding powder which consists essentially of polymerizing tetrafluoroethylene at a temperature of 0–100° C. and a pressure of 1–40 atmospheres in the presence of water, 0.01–0.8 by weight ratio to the water of an organic liquid boiling below 150° C., said organic liquid being one in which chain transfer does not readily take place, and which readily disperses in said water in the form of drops and a polymerization catalyst which is water-soluble but is insoluble in said organic liquid, said reaction being effected with stirring so that the organic liquid is completely dispersed in the water, said tetrafluoroethylene being polymerized until the amount obtained of the resulting polymer ranges between 0.7 and 2.5 grams per milliliter, based on the volume of said organic liquid.

6. A method of preparing nearly spherical granular polytetrafluoroethylene molding powder which consists essentially of polymerizing tetrafluoroethylene at a temperature of 0–100° C. and a pressure of 2–30 atmospheres in the presence of water, 0.07–0.4 by weight ratio to the water of an organic liquid boiling below 150° C., said organic liquid being one in which chain transfer does not readily take place and which readily disperses in said water in the form of drops, and a polymerization catalyst which is water-soluble but is insoluble in said organic liquid, said reaction being effected with stirring so that the organic liquid is completely dispersed in the water, said tetrafluoroethylene being polymerized until the amount obtained of the resulting polymer ranges 0.7 and 2.5 grams per milliliter, based on the volume of said organic liquid.

7. The method according to claim 1 wherein said organic liquid is saturated perfluorinated hydrocarbon.

8. The method according to claim 1 wherein said organic liquid is a saturated fluorinated halohydrocarbon.

9. The method according to claim 1 wherein said organic liquid is at least one member selected from the group consisting of tetrachlorodifluloroethane, trichlorotrifluoroethane, dichlorotetrafluoroethane, 1-chloro-3-hydro - hexafluoropropane, 1 - chloro - 4 - hydro - octafluorobutane, perfluorohexane and perfluoroheptane.

10. The nearly spherical granular polyletrafluoroethylene molding powder prepared according to the method of claim 1.

References Cited
UNITED STATES PATENTS

| | | | |
|---|---|---|---|
| 2,952,669 | 9/1960 | Bro | 260—92.1 |
| 3,345,317 | 10/1967 | Hoashi | 260—92.1 |

JOSEPH L. SCHOFER, Primary Examiner

J. A. DONAHUE, Jr., Assistant Examiner